No. 837,881. PATENTED DEC. 4, 1906.
G. C. PLUMMER.
SKATE ROLLER.
APPLICATION FILED MAR. 12, 1906.
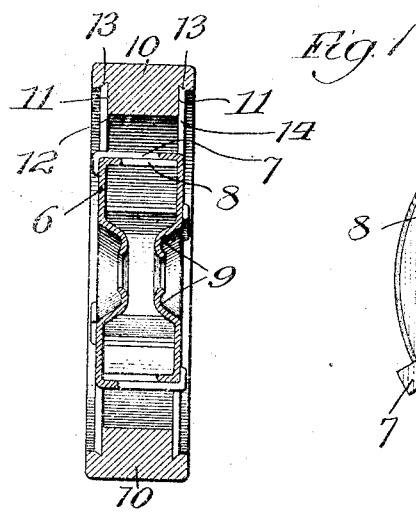
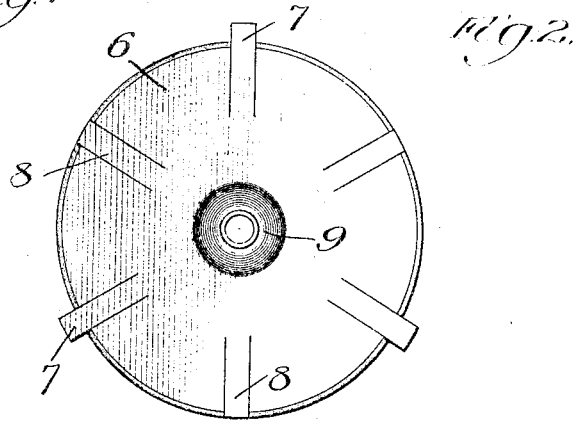
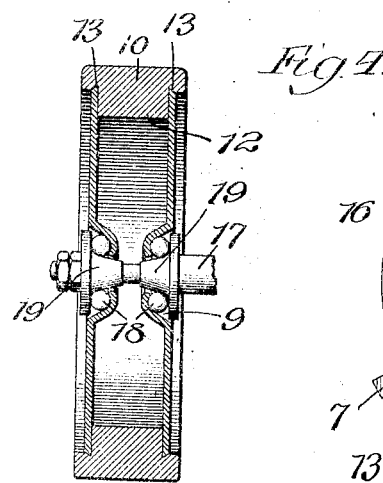
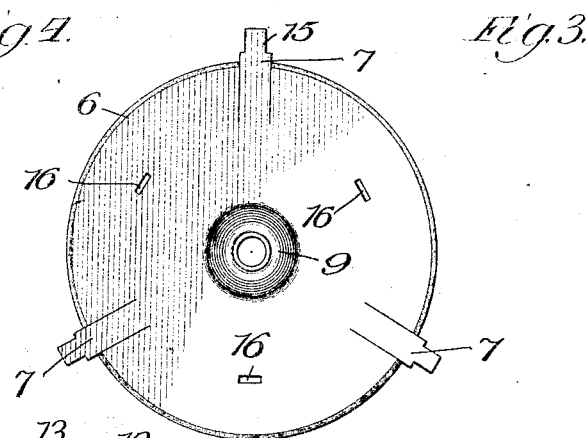
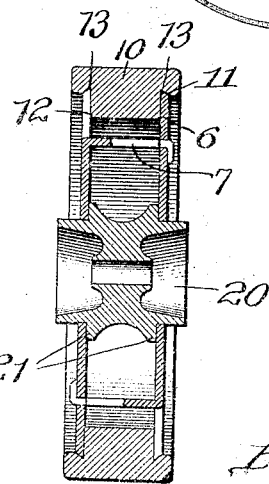
Witnesses:
Inventor:
George C. Plummer,
By Dyrenforth, Dyrenforth & Lee,
Att'ys

UNITED STATES PATENT OFFICE.

GEORGE C. PLUMMER, OF CHICAGO, ILLINOIS, ASSIGNOR OF ONE-HALF TO THOMAS J. HRUBY, OF CHICAGO, ILLINOIS.

SKATE-ROLLER.

No. 837,881.

Specification of Letters Patent.

Patented Dec. 4, 1906.

Application filed March 12, 1906. Serial No. 305,627.

*To all whom it may concern:*

Be it known that I, GEORGE C. PLUMMER, a citizen of the United States, residing at Chicago, in the county of Cook and State of Illinois, have invented a new and useful Improvement in Skate-Rollers, of which the following is a specification.

Skate-rollers wear quite rapidly at the tires, and it frequently becomes necessary to discard rollers as hitherto usually constructed when merely the tire portions are worn out.

My object is to provide a ball-bearing skate-roller having a comparatively thick or heavy tire and so constructed that the same may be readily removed and replaced with a new one when necessary.

My object is further to provide such a roller of a particularly strong and durable construction in which the parts of the roller are detachably secured together without the use of rivets or bolts and nuts.

Referring to the accompanying drawings, Figure 1 is a view in cross-section of my improved skate-roller, the section being taken through its diameter. Fig. 2 is a plan view of a sheet-metal blank or disk forming one of the roller-centers. Fig. 3 is a similar view of a modification of the sheet-metal disk shown in Fig. 2. Fig. 4 is a view similar to Fig. 1 of a modification of the roller, showing a ball-bearing axle mounted therein; and Fig. 5, a view similar to Fig. 4 of another modification of the roller.

In Figs. 1 and 2 is illustrated the preferred embodiment of my invention, which consists of a sheet-metal blank or disk 6, forming a roller-center, in which are cut radial tongues 7 7, extending beyond its circumference, and radial tongues 8 8 with their ends flush with the edge of the disk and alternating with the tongues 7. The central portion of the disk is perforated and stamped to form a hub or ball-race 9, and the tongues 7 and 8 are bent correspondingly at right angles to the body of the disk. 10 is a tire or tread portion relatively heavy compared with the disks and provided with annular recesses 11 in its opposite faces, forming shoulders 12. 13 represents annular sockets in the walls of the recesses for receiving the edges of the disks when expanded into them, as hereinafter described. Two of the disks 6 are employed for forming each roller, the disks being fitted at their peripheries into the annular sockets 13 by springing the disks to thus cause them to be expanded at their outer edges into the sockets, the disks engaging the shoulders 12 to hold the disks rigidly separated from each other. The shoulders 12 serve as guides to direct the disks 6 into position in the undercut recesses 13 thereof, as well as to support such disks on their rear sides, extending, as they do, some distance below the point where the edges of the disks contact with the undercut portions thereof. The disks are positioned in the recesses to cause each of the tongues 7 to overlap and coincide with one of the tongues 8 on the opposed disk, the tongues projecting through the openings or recesses 14 in the disks beyond the tongues 8. The tongues 7 are then bent over at their outer projecting ends against the outer surface of the disks, as indicated in Fig. 1. The tongues 8 thus abut at their ends against the inner surfaces of the opposed disks and maintain the disks rigidly separated from each other.

The modification of roller-center illustrated in Fig. 3 differs from the construction just described in that the tongues 7 instead of being of uniform width are shouldered at their outer ends, as indicated at 15, and radial slots 16, corresponding in size to the outer shouldered ends of the tongues 7 and alternating with them, are substituted for the tongues 8. The disks are applied to the tire in the manner described as to the construction shown in Fig. 2, the only difference being in the manner of holding the parts together, which in this case is accomplished by causing the tongues 7 to project at their shouldered ends through one of the slots or openings 16 in the opposed disks, the projecting ends being then bent over against the outer surface of the disks.

In the modification illustrated in Fig. 4 the disks differ from that just described in that no tongues or slots are provided for clamping the plates in position, the disks being held in place by engagement of their peripheries with the annular sockets 13 and shoulders 12. In this figure the skate-roller is shown journaled on a ball-bearing axle 17, the balls 18 of which are housed between the ball-races 9 and cones 19 on the axle.

In the modification shown in Fig. 5 the hub 20 of the roller instead of being integral with the disks is a separate part therefrom and is provided with a central annular flange 21 about its outer circumference. The form of disk illustrated is the same as that shown in Fig. 3, excepting that it has its central portion cut away to adapt the disks to fit upon the hub 20 from its opposite sides against the flanges 21 and be clamped together, as described with reference to the construction shown in Fig. 3, for securing the tire 10, hub 20, and disks 6 rigidly together.

While I have illustrated and described my skate-roller as being provided with annular sockets in its tire-recesses, into which the disks are expanded, the use of sockets as relates to the constructions shown in Figs. 1, 2, 3, and 5 are not necessary in carrying out my invention, a shoulder only on each of the opposite faces of the tire against which the disks may abut being necessary.

What I claim as new, and desire to secure by Letters Patent, is—

1. In a hollow skate-roller, the combination with a comparatively heavy tire, provided in opposite faces with annular recesses, of annular shoulders surrounding the recesses, said shoulders being undercut, and roller-centers comprising annular sheet-metal disks expanded at their circumferential edges into engagement with the undercuts, the cut-away portion of the tread extending below the point of contact of the roller-centers with the undercut portions.

2. In a hollow skate-roller, the combination with a comparatively heavy tire, provided in opposite faces with annular recesses, of shoulders surrounding the recesses, said shoulders being undercut, and roller-centers comprising annular sheet-metal disks formed with inner ball-race members, and expanded at their circumferential edges into engagement with the undercuts, the cut-away portion of the tread extending below the point of contact of the roller-centers with the undercut portions.

3. In a hollow skate-roller, the combination of a comparatively heavy tire provided in opposite faces with annular recesses surrounded by shoulders, and roller-centers comprising annular sheet-metal disks fitting said shoulders at their peripheries, and means for fastening the disks in place comprising a series of tongues each cut from one of the disks and bent inwardly to extend to and engage the other disk.

4. In a hollow skate-roller, the combination of a comparatively heavy tire provided in opposite faces with annular recesses surrounded by shoulders, and roller-centers comprising annular sheet-metal disks formed with recesses, and fitting said shoulders at their peripheries, and means for fastening the disks in place, comprising tongues cut from one of the disks forming shoulders to bear against the opposing disk and having end portions passing through the recesses in said opposing disk and upset beyond said recesses.

5. In a hollow skate-roller, the combination of a comparatively heavy tire provided in opposite faces with annular recesses surrounded by shoulders, and roller-centers comprising annular sheet-metal disks formed with recesses and fitting said shoulders at their peripheries, and means for fastening the disks in place, comprising tongues each cut from one of the disks and formed with shouldered ends to bear at their shouldered portions against the opposing disk, the end portions beyond said shoulders passing through the recesses in said opposing disks and being fastened beyond said recesses.

GEORGE C. PLUMMER.

In presence of—
W. B. DAVIES,
A. M. UHER.